H. R. AULD.
VEHICLE TIRE.
APPLICATION FILED AUG. 5, 1913.
1,197,587.
Patented Sept. 12, 1916.
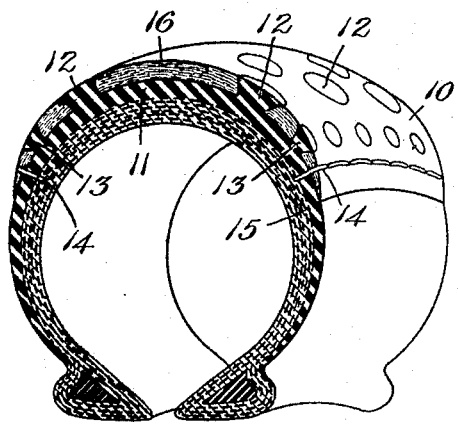
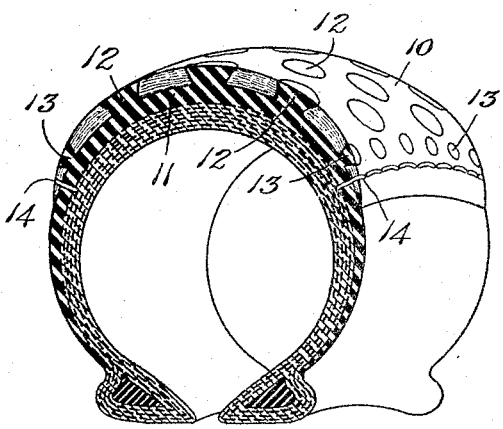
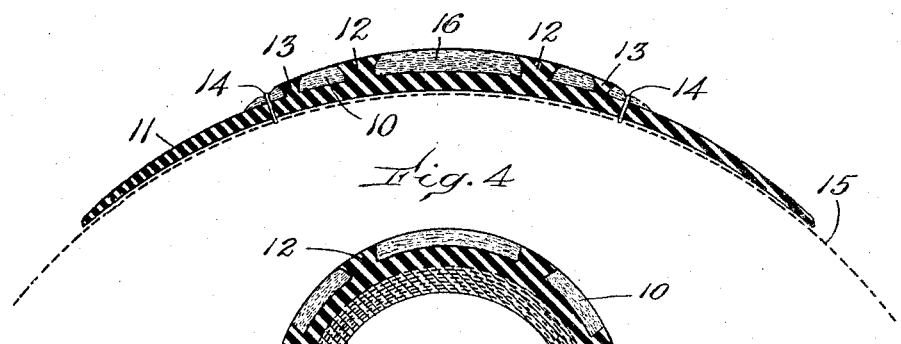
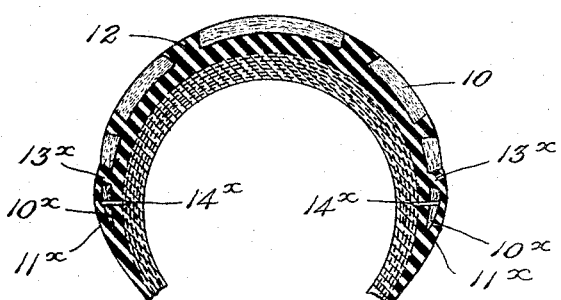

UNITED STATES PATENT OFFICE.

HUGH R. AULD, OF BOSTON, MASSACHUSETTS, ASSIGNOR TO GEORGE E. CARR, OF WEST ROXBURY, MASSACHUSETTS.

VEHICLE-TIRE.

1,197,587.  Specification of Letters Patent.  Patented Sept. 12, 1916.

Application filed August 5, 1913. Serial No. 783,097.

*To all whom it may concern:*

Be it known that I, HUGH R. AULD, a subject of the King of Great Britain, and resident of Boston, in the county of Suffolk and State of Massachusetts, have invented certain new and useful Improvements in Vehicle-Tires, of which the following is a specification.

This invention relates to vehicle tires in which rubber is one of the principal elements.

As rubber slips easily on smooth pavements which are wet, I provide the tire with a tread of felt, and my invention consists in the means whereby the felt and rubber elements are united. This means consists in studs or projections formed on the rubber element and extending through the felt layer, the rubber studs being larger at their outer ends than at their base, and the sockets in the felt occupied by the rubber studs being correspondingly shaped so that the layer of felt is held against the rubber body by interlocking coaction of the rubber studs and felt. The marginal portions of the felt I prefer to secure by stitches which pass through the rubber and preferably through a layer of woven fabric upon the inner side of the rubber or embedded therein, such fabric affording a firm anchorage for the stitches so that the stitches will not be likely to pull through and tear the rubber.

Of the accompanying drawings, which illustrate two forms in which the present invention may be embodied: Figure 1 represents a perspective view of a short section of a tire in which the parts are assembled as for use. Fig. 2 represents a similar view showing a different arrangement of the rubber studs which coact with the felt tread layer. Fig. 3 represents a cross-sectional view of some of the elements of the tire as assembled prior to completing the tire. Fig. 4 represents a cross section of a tire embodying a modification of my invention.

The same reference characters indicate the same parts wherever they occur.

The accompanying drawings show my invention embodied in a shoe for a pneumatic tire, but the invention may be embodied with similar advantages in a solid tire, and it is to be understood that I do not limit my invention to pneumatic tires or to the exact forms shown.

The felt tread layer is indicated at 10. This layer lies in contact with a layer of rubber 11 and is provided with suitable sockets for the reception of stud members 12 molded upon the rubber body 11. The outer ends of the stud members are larger than their inner ends, as clearly shown, and the sockets in the felt layer are corresopndingly formed, to the end that the elements 10 and 11 become interlocked with each other by the headed or flanged studs 12. The felt layer 10 is preferably not impregnated with rubber or any of its compounds, because the felt fibers in their natural condition are best adapted to prevent slipping. It is desirable, however, to cause the rubber elements to adhere to the felt, and for this purpose a coating of cement may be applied to the felt prior to uniting the rubber and felt. This cement becomes vulcanized when the tire is completed as hereinafter explained.

The stud members 12 are arranged in endless rows which extend around the tire, and they are arranged to bear upon the ground when the tire is in use. The rubber body 11 is provided with two additional rows of stud members 13, which are relatively small and which are more closely disposed with relation to each other than the stud members 12. The stud members 13 are interlocked with the felt layer in substantially the same manner as the stud members 12, but are not intended to bear upon the ground. The function of the studs 13 is to secure the marginal portions of the felt layer. It will be observed that the thickness of the felt layer diminishes toward its edges. In order to more firmly secure the marginal portions of the felt, I stitch the same to the rubber by rows of stitches 14 which are preferably outside the rows of studs 13. The stitching operation is performed before the elements 10 and 11 are incorporated with the other elements of the tire, and it is possible, therefore, to extend the stitches through the elements 10 and 11 without causing them to extend to the interior surface of the completed tire. I prefer to include a layer of suitable fabric 15, such as canvas, with the elements which are stitched, and to pass the stitches through this fabric so that the stitches will be secured at the inner side more firmly than if the rubber body 11 were all that prevented the stitches from pulling through. As it is customary to use several layers of fabric, such as that indicated at 15, in rubber tires, to reinforce the same, one of the layers of such reinforcing fabric may conveniently be used for the purpose of receiving the stitches 14 as above explained. After the elements shown by Fig. 3 have been assembled and secured to each other as shown, to form in effect a unit, they are assembled with the other elements which make up the interior of the tire and are molded and vulcanized as usual to complete the tire substantially as shown by Figs. 1 and 2, the layer 15 being thus incorporated with additional layers of reinforcing fabric and embedded in rubber according to the well-known arrangement. When the tire is completed, the rubber body 11 and the usual body of rubber in which the layers of reinforcing fabric are embedded become united into a homogeneous body through which the stitches 14 extend part way, the inner loops of the stitches being interlocked with an embedded layer of reinforcing fabric.

According to Figs. 1 and 3, there are four rows of studs 12, two of which rows are at one side of the median line of the tire and two of which are at the opposite side of said line, leaving a continuous uninterrupted central body 16 of felt for contact with the surface upon which the tire is rolling. This central body 16, which is exclusively felt, enables the tread layer to obtain a firm hold upon slippery pavements, and although the studs 12 of the two adjacent rows would have some contact with the pavement, the greatest pressure would be sustained by the central body 16. According to the arrangement shown by Fig. 2, there are five rows of stud members 12, including a central row and two rows on either side of the central row. Except for this difference in the arrangement of the stud members 12, the two forms are alike. As there are fewer rows in the form shown by Fig. 1, the stud members 12 may be slightly larger than those in the form shown by Fig. 2, and, on the other hand, the form having the smaller stud members may have a larger number of stud members and they may be more closely arranged.

Fig. 4 shows a modification in which the edges of the felt tread layer are embedded in the rubber body and in which the stitches which secure the marginal portions of the tread layer are entirely inclosed by rubber. In this figure the marginal portions of the felt tread layer are indicated at $10^x$, and the stitches which secure them to the stitch-receiving layer of reinforcing fabric are indicated at $14^x$. An outer layer $11^x$ overlaps the marginal portions $10^x$ and the stitches $14^x$ and is vulcanized to the outer side of the felt body. The rubber portions $11^x$ are preferably extended to the smaller rubber studs which are indicated at $13^x$, and are vulcanized to the outer ends of said studs. These studs therefore serve to hold the layers $11^x$ of rubber while at the same time holding the marginal portions of the felt layer as hereinbefore explained. The effect of extending the rubber layers $11^x$ outside the marginal portions $10^x$ is to prevent the liability of pulling the portions $10^x$ away from the inner elements of the tire. The stitches $14^x$ in this form are arranged at diametrically opposite points with reference to the center of the cross section of the tire, in which position they are subjected to the least chafing upon each other in consequence of compressing and expanding the tire. When the tire is compressed and expanded, the side portions in which the stitches are located move toward and from each other with comparatively little flexure, the portions above and below the stitches being subjected to a greater degree of flexure. This location of the stitches is therefore the most desirable, because in this position the stitches are not subjected to excessive chafing and cutting action.

I claim:—

1. A tire comprising a body of rubber and a tread layer of fabricated fibrous material, and stitches connecting the marginal portions of said tread layer and said rubber body, said rubber body having flanges overlapping said marginal portions and stitches, said rubber body having stud portions extending through said tread layer between the longitudinal center of said tread layer and said stitches, the outer ends of said stud portions and the free edges of said flanges being united.

2. A tire comprising a body of rubber and a tread layer of fabricated fibrous material, said rubber body having stud portions extending through said tread layer and having flanges overlapping the marginal portions of said tread layer, the free edges of said flanges and the outer ends of said stud portions being united.

3. A tire body including in its construction an outer layer of rubber composition having substantial thickness, and a tread layer of felt outside of said rubber layer having rows of holes near its opposite edges and having also numerous larger holes in and adjacent to its central portion throughout the entire longitudinal extent thereof, and the rubber layer having integral projections contained in all of said holes, and also having integral layers overlapping the edges of the tread layer and united with the outer ends of the projections contained in the holes nearest to the edges of the tread layer.

In testimony whereof I have affixed my signature, in presence of two witnesses.

HUGH R. AULD.

Witnesses:
   WALTER P. ABELL,
   P. W. PEZZETTI.

Copies of this patent may be obtained for five cents each, by addressing the "Commissioner of Patents, Washington, D. C."